Oct. 26, 1971  J. M. VALDESPINO  3,615,017
OIL ENTRAPMENT AND CONTAINMENT WATERCRAFT
Filed Dec. 15, 1969
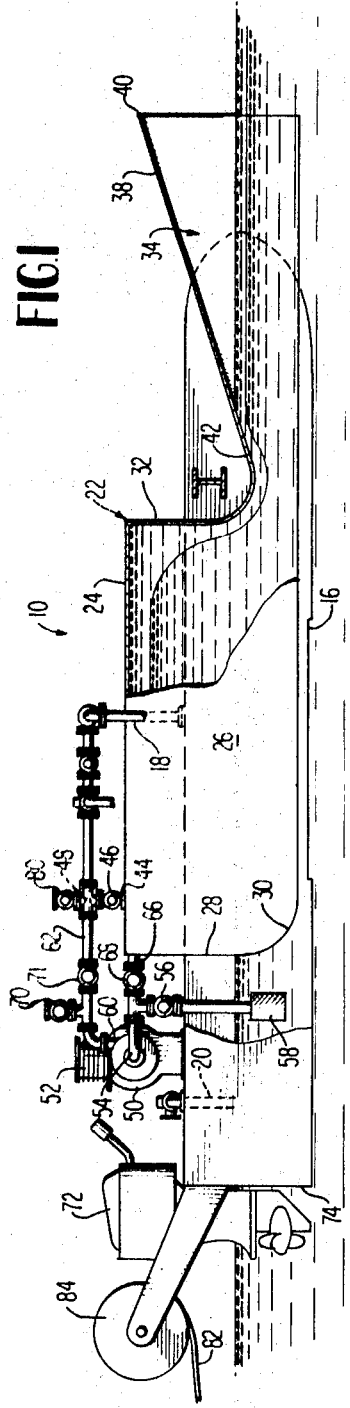
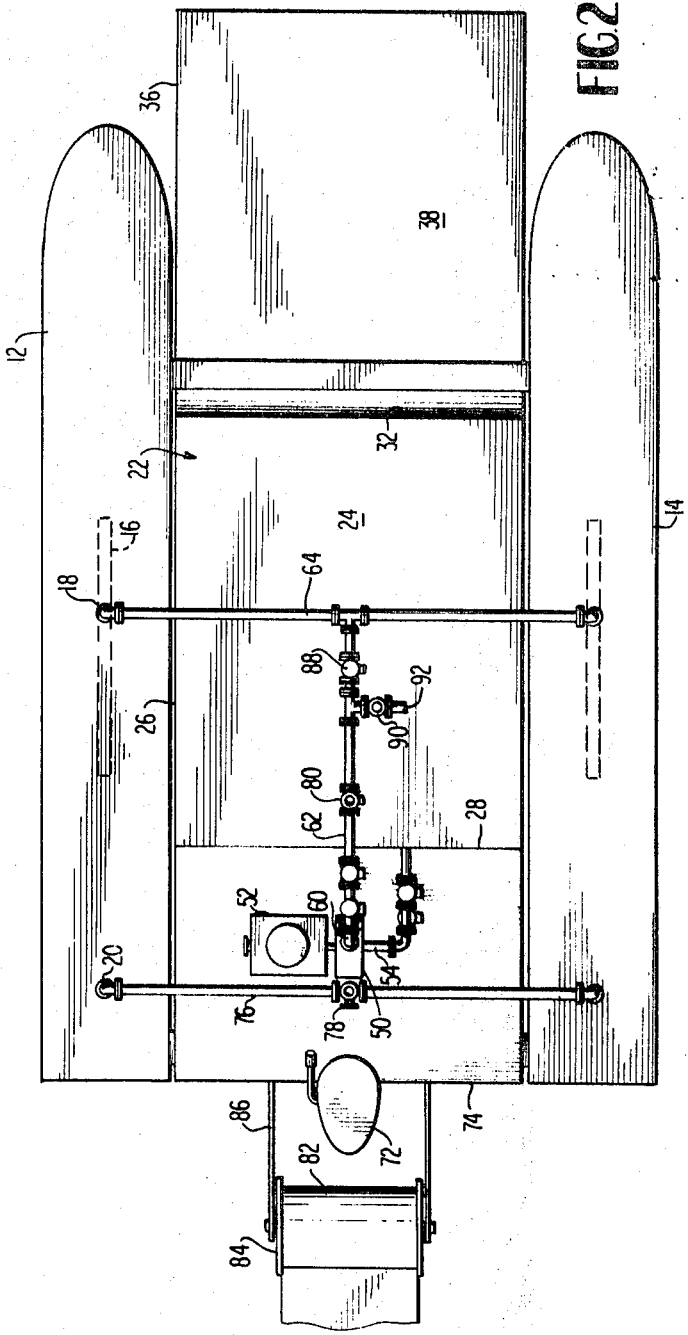
INVENTOR
JOE M. VALDESPINO
BY
ATTORNEYS

United States Patent Office 3,615,017
Patented Oct. 26, 1971

3,615,017
OIL ENTRAPMENT AND CONTAINMENT WATERCRAFT
Joe M. Valdespino, 5023 Golf Club Parkway, Orlando, Fla. 32808
Filed Dec. 15, 1969, Ser. No. 884,899
Int. Cl. E02b 15/04
U.S. Cl. 210—242
10 Claims

ABSTRACT OF THE DISCLOSURE

An oil slick entrapment and containment watercraft has a pair of pontoons buoyantly supporting an open-bottomed entrapment tower and a funnel-shaped surface skimming shroud. The open bottom of the entrapment tower is below the water level; and, as the craft moves on the water having an oil slick, the oil passes into the skimmer and into the entrapment tower where the column of liquid is raised by vacuum applied to the top of the entrapment tower. Oil rises to the top of the water in the entrapment tower due to the difference in specific gravity and without emulsifying and is then pumped off the top. A single pump carried by the craft is connected by suitable piping arrangements and provides multiple functions including; drawing vacuum in the entrapment tower by aspirating air from the entrapment tower through an aspirator, supplying air to the pontoons, and pumping the oil from the entrapment tower. The buoyancy of the pontoons is controlled by supplying air and water to the top of the pontoons allowing the water to escape out of a slot in the botom of the pontoons and providing air purge lines in the pontoons.

BACKGROUND

Field of the invention

This invention relates to a watercraft utilizable to recover spilled oil in harbors or moderate seas in effective volumes, retain the recovered oil in a manner of storage which allows and permits gravity separation of accumulated oil from water and allows it to be transferred to barges, tanks or other larger collection receptacles.

Description of the prior art

Various watercraft and skimming devices are presently known which require pumping of a skim surface of oil. These skimmers require entrainment of oil with water in a conduit of confined area and during the pumping this results in mixing and an emulsion of oil and water is pumped out. This mixture is exceedingly difficult to separate and the capacity of the collective volume is reduced by the water entrained with the oil by emulsion. The recovery of this oil for practical reuse purposes is impossible without fracturing the emulsion.

Other presently known oil slick recovery devices utilize rotating sponges which absorb oil on a sponge. Primary pressure is applied to the sponge by a bar to release the water and a secondary bar applies a greater pressure to release oil into a channel where it is collected and pumped. This device has disadvantages of an exceedingly slow pickup rate and the emulsifying effect of oil and water under the compressive forces of the secondary squeezing with the same consequences of emulsions as set forth above. This device also has low total storage volume of on craft capacity and the oil film content is returned to the water at the primary pressure point.

SUMMARY OF THE INVENTION

This invention provides a craft which will travel over an oil slick on water leaving an undisturbed oil surface. The oil passes undisturbed under a bottomless funnel and into a raised liquid column in an entrapment tower where it rises to the top due to its low specific gravity without being emulsified. The level of water and oil in the entrapment tower is raised by vacuum, and the oil which rises to the top may be pumped out through any suitable storage receptacle such as oil drums or a stand-by barge. As oil is pumped from the entrapment tower, the water rises again and when the oil is unloaded, more oil can be skimmed into the entrapment tower. This arrangement provides minimum disturbance of the oil so that the oil is not emulsified with water and the quiescence in the entrapment tower allows for gravitational separation of any entrained water of impurities back through the open bottom of the tower. A single pump, venturi, and piping connections are utilized for the multiple functions of withdrawing the oil which has risen to the top of the entrapment tower, creating a vacuum in the entrapment tower, controlling the bouyancy in the pontoons, and, if desired, inflating an oil slick containment tube. The pump inlet has two piping connections, one to the entrapment tower and another to the sea, and the pump outlet has valved connections to the entrapment tower, and to a venturi. The aspirator of the venturi has two connections, one to the top of the entrapment tower and the other to the atmosphere, and the outlet of the venturi aspirator is connected to the pontoons. Each pontoon has a slotted outlet in the bottom and an air purge line controlled by a purge valve.

BRIEF DESCRIPTION OF THE DRAWINGS

FIG. 1 is a side sectional elevation of the craft of this invention with portions broken away for the sake of clarity;

FIG. 2 is a top plan view of the craft of this invention as shown in FIG. 1.

DETAILED DESCRIPTION OF THE INVENTION

Referring to the drawings, a watercraft 10 is supported in the water by a pair of side pontoons 14 and 12 which are of a suitable size and length as required for the desired buoyancy. Each pontoon is identical and only one will be described. Each pontoons has an open slot 16 in its bottom, an air and water inlet line 18, and a purge line 20 connected thereto, the purge line extending down to the desired minimum water level.

Contained between and supported from the pontoons is an entrapment tower 22 which is an inverted air tight tower having an open bottom. That is, entrapment tower 22 has a closed top 24, a pair of side walls 26, a rear wall 28 with a forwardly extending bottom 30, and a front wall 32. All of the walls extend below the normal water surface and the bottom of the entrapment tower is open at the water line of normal operation.

Forwardly of the entrapment tower 22 is a skimming shroud 34 having a pair of side walls 36 and a top 38 shaped as half a funnel with a forward end 40 above the water line and a curved rear end 42 below the water line, the curved rear end of the skimming shroud 34 merges with the front wall 32 of the entrapment tower as shown in FIG. 1.

Means are provided for drawing a vacuum in the top of the entrapment tower 22 to raise a column of liquid therein above the normal water level. This means includes a connection 44 and a valve 46 leading to the aspirating side of a venturi 48. A pump 50 driven by suitable motor 52 has an inlet 54 connected through valve 56 to a strainer 58 below the surface of the water so that when the pump is pumping and the valve 56 is open, the water on which the craft is supported passes through the strainer and through the pump. A pump outlet 60 is connected to line 62 to the inlet side of the venturi 48 so that the water pumped passes through the venturi and with valve 46 open aspirates air from the top of entrapment tower 22. The aspirated air entrained in the water is discharged through connections 64 to the air and water inlet lines 18 in the pontoons 12 and 14.

Means to withdraw oil from the top of the raised column of liquid in the entrapment tower 22 includes the same pump 50 and a connection 66 to the top of the entrapment tower controlled by a valve 68 leading to the inlet 54 of the pump. A valve outlet 70 and another valve 71 are manipulated to allow the pump to withdraw oil from the top of the entrapment tower and discharge it through the outlet controlled by valve 70.

The craft may be driven by a suitable motor 72 or any other form of known motive power and includes a deck or hull 74 for an operator.

Means for controlling the buoyancy of the pontoons 12 and 14 further include a cross connection 76 from each purge line 20 connected to a three-way valve 78. Manipulation of the three-way valve can control the buoyancy selectively of each pontoon while the depth of the air purge line 20 provides a minimum of buoyancy to prevent the craft from sinking.

If desired, the rear of the craft may be utilized to support an inflatable tube 82 of the type commonly used to surround an oil slick. The tube is wound on a reel 84 supported by a bracket 86 from the back of the craft. A valve 88 and 90 are manipulated to close valve 88, open valve 90 controlling line 92 so that air and water from the venturi aspirator 48 are discharged out line 92 to inflate the tube 82 as it is unreeled.

In operation, when the craft is first launched, the pontoons are full of air and the craft has no appreciable depth. It is then driven to the oil spill area and valve 78 is open to purge air from the pontoons through lines 20 and 76. Water flows into the pontoons through slots 16 to reduce the buoyant effect of the pontoons and lower the rear end 42 of the skimming shroud from above the surface of the water to below the water level. The rear of the skimming shroud 34, which is also the front wall 32 of the entrapment tower, must always be below the water surface during operation to prevent venting of entrapment tower 22. The motor 52 can be started to start driving the pump 50. Valve 56, 71, and 46 are opened and all other valves are closed so the pump 50 will pump sea water through the venturi 48 and aspirate air from the top entrapment tower 22 to raising the column of liquid within the entrapment tower. The water and evacuated air are discharged through lines 18 into the pontoons with air exiting the pontoons through line 20 and water leaving through slots 16. The depth of the pipe 20 extends into the pontoon to a level to insure minimum buoyancy. That is, when the bottom of pipe 20 is covered by water, no air can escape precluding the possibility of over purging and the craft sinking. After the vacuum is drawn in the entrapment tower, valves 71, 80, and 46 should be closed when the desired draft is reached to prevent purging of the air when the pump 50 is shut off. Further operation of the pump is not required until the oil needs to be unloaded.

The craft may be raised to lower the skimming depth by opening the atmospheric air inlet valve allowing air to flow into the venturi during pump operation to discharge more air and water into the pontoons and valve 78 is closed to retain the air in the pontoons. When the desired skimming depth is reached, the pump is turned off. It is desirable to have variable skimming depth to meet existing sea conditions. The most effective skimming will be accomplished with the lowest point at the back 42 of the skimming shroud is under a minimum depth of water. However, this depth must be increased with higher waves to preclude the possibility of venting the trap door on the tower by air entering the bottom shroud.

As the motor 72 drives the craft over the oil slick, oil flows under the shroud into the entrapment tower 22 where it rises to the top by specific gravity displacing water out the open bottom. When a sufficient depth of oil is in the top of the entrapment tower, it is pumped out by pump 50 by opening valves 68 and 70 and closing all other valves.

When it is desired to inflate tube 82, for example to surround an oil slick, the valve 88 is closed, valve 90 is opened, pump 50 is started, valves 46 or 80 are open as required, valve 71 is open, valve 70 is closed, valve 68 is closed, valve 56 is open, so the air aspirated by venturi 48 is discharged together with the sea water through line 92 to inflate the tube 82 as it is paid off of reel 84.

Also, if desired, water jet propulsion by the single pump can be provided with slight modification of the piping and valve arrangement instead of using an outboard motor.

What is claimed is:

1. An oil slick entrapment and containment watercraft comprising: an entrapment tower on the craft in fluid communication with water in which it floats, the tower being closed at the top and all sides, a water skimming shroud at the front of the craft including an open front, rear and bottom, with the shroud enclosing the top and sides of a water entrance passage leading directly into the entrapment tower, buoyancy control means associated with the craft and constructed and arranged so that, during the oil entrapment operation, the front end of the top of the shroud is above the water surface and the rear end of the top of the shroud is below the water surface thereby forming within the entrapment tower a fluid tight space defined by the top and side walls of the tower and liquid surface in the tower, the top of the tower being spaced from the liquid surface, means to draw a vacuum above the surface of liquid in the entrapment tower, and means for withdrawing oil which rises by virtue of its lesser specific gravity to the top of the water in the entrapment tower, the path of fluid communication between the entrapment tower and the water in which the craft floats allowing the discharge of water from below the oil level in the entrapment tower.

2. A craft as in claim 1 wherein the bouyancy control means includes a pair of pontoons, one on each side of the entrapment tower and skimming shroud, and adjustable means for controlling the buoyancy of the pontoons above a minimum level of buoyancy.

3. A craft as in claim 2 wherein the adjustable means for controlling the buoyancy of the pontoons includes a line for admitting air and water to each pontoon, a venturi, a pump for forcing water through the venturi, and aspirating air into the venturi, and discharging the air and water from the venturi into each pontoon, and a water opening in the bottom of each pontoon.

4. A craft as in claim 3 further comprising means for controllably admitting air to the venturi for aspiration comprising a valved line to the top of the entrapment tower and a valved line to atmosphere from the venturi, the valve line to the top of the entrapment tower constituting the means for creating vacuum in the vacuum tower.

5. A craft as in claim 1 further comprising a pump carried by the craft, means selectively connecting the pump inlet to the entrapment tower, and to water in which the craft operates, means selectively connecting the pump outlet to a line containing a venturi and discharging into pontoons constituting a portion of the buoyancy control means and to an oil discharge outlet, and a valved connection between the top of the entrapment tower and an aspirating inlet to the venturi.

6. A craft as in claim 5 further comprising means for selectively purging air from each pontoon to stabilize the attitude of the craft and control the draft.

7. A craft as in claim 6 wherein the means for purging includes a purge line extending into each pontoon and valve means connecting the purge line to atmosphere.

8. A craft as in claim 1 wherein the means for drawing vacuum in the top of the entrapment tower is an aspirator line connected to a venturi, the venturi connected to a pump outlet, the means for withdrawing oil from the entrapment tower includes the pump with an inlet line to the entrapment tower, the means for controlling the buoyancy includes a pair of pontoons, air and water inlet lines into each pontoon, from the venturi and an air purge connection to each pontoon.

9. A craft as in claim 1 wherein the means to draw a vacuum includes a pump carried by the craft and a conduit connected to the top of the vacuum tank.

10. A craft as in claim 1 wherein the craft is open at the bottom underneath the entrapment tower to provide the path of fluid communication between the entrapment tower and the water in which the craft floats.

References Cited
UNITED STATES PATENTS

| | | | |
|---|---|---|---|
| 61,880 | 2/1867 | Serrell | 210—242 |
| 2,876,903 | 3/1959 | Lee | 210—242 |
| 3,517,812 | 6/1970 | Bucchioni et al. | 210—242 X |

SAMIH N. ZAHARNA, Primary Examiner

U.C. Cl. X.R.

210—Dig. 21